(12) United States Patent
Kayahara et al.

(10) Patent No.: US 7,657,454 B2
(45) Date of Patent: Feb. 2, 2010

(54) SERVER-SIDE PROJECT MANAGER

(75) Inventors: Roy Kayahara, Richmond Hill (CA); Edward J. Schultz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 11/199,757

(22) Filed: Aug. 9, 2005

(65) Prior Publication Data
US 2007/0038489 A1 Feb. 15, 2007

(51) Int. Cl.
G06F 9/44 (2006.01)
G06F 9/46 (2006.01)

(52) U.S. Cl. .............................................. 705/7; 705/8
(58) Field of Classification Search ....................... 705/7
See application file for complete search history.

(56) References Cited

U.S. PATENT DOCUMENTS

| | | | | |
|---|---|---|---|---|
| 5,765,140 | A | 6/1998 | Knudson et al. | 705/9 |
| 6,493,826 | B1 * | 12/2002 | Schofield et al. | 726/22 |
| 6,519,763 | B1 | 2/2003 | Kaufer et al. | 717/101 |
| 6,591,300 | B1 | 7/2003 | Yurkovic | 709/226 |
| 7,506,302 | B2 * | 3/2009 | Bahrami | 717/100 |
| 2002/0154178 | A1 * | 10/2002 | Barnett et al. | 345/853 |
| 2002/0165723 | A1 | 11/2002 | Kroeger | 705/1 |
| 2003/0028393 | A1 | 2/2003 | Coulston et al. | 705/1 |
| 2003/0046134 | A1 | 3/2003 | Frolick et al. | 705/8 |
| 2003/0061330 | A1 | 3/2003 | Frisco et al. | 709/223 |
| 2003/0107587 | A1 | 6/2003 | Maritzen et al. | 345/700 |
| 2003/0225587 | A1 | 12/2003 | Mueller | 705/1 |
| 2004/0030590 | A1 | 2/2004 | Swan et al. | 705/7 |
| 2004/0030992 | A1 | 2/2004 | Moisa et al. | 715/513 |
| 2005/0027386 | A1 | 2/2005 | Weigand et al. | 700/97 |
| 2005/0086248 | A1 | 4/2005 | Atchison | 707/102 |
| 2005/0097505 | A1 * | 5/2005 | Gupta et al. | 717/101 |

FOREIGN PATENT DOCUMENTS

| | | |
|---|---|---|
| WO | WO 01/86477 A2 | 11/2001 |
| WO | WO 02/088944 A1 | 11/2002 |

OTHER PUBLICATIONS

Goudarzi, Kaveh Moazami and Kramer, Jeff ("Maintaining node consistency in the face of dynamic change," Proceedings, Third International Conference on Configurable Distributed Systems, 1996.*

(Continued)

*Primary Examiner*—Scott L Jarrett
*Assistant Examiner*—George H Walker
(74) *Attorney, Agent, or Firm*—Merchant & Gould; Ryan T. Grace

(57) ABSTRACT

A server-side project manager utilizes a set of web service APIs to create, update, schedule and manage projects on a server. A user submits a project update request when the user creates a new project or modifies an existing project. The project update request is associated with an API that calls the server via a web service to update the project. Example APIs include a data retrieval call, an administrative call or a data update call. A processor compares the project update request to any existing project definition to identify update values. A set of calculations is performed using the update values and any existing project definition. The project is updated based on the calculation results and stored in a data store.

20 Claims, 4 Drawing Sheets

OTHER PUBLICATIONS

Stover, Teresa, Microsoft Office Project 2003 Inside Out, Microsoft Press, 2004, pp. 115, 609-611.*

Stover, Teresa, Microsoft Office Project 2003 Inside Out, Microsoft Press, Oct. 2003).*

Special Edition Using Microsoft® Office® Project 2003 (Timothy W. Pyron, Ph.D., Que Publishing, Feb. 2004.*

King, Nelson ("Project.net, Inc." PC Magazine, New York: Oct. 15, 2002. vol. 21, Iss. 18; p. 28) an indication of the state of the art for web-based project management.*

George Lawton. "Project management comes to the Internet," Software Magazine; Apr. 1997.*

Anonymous. "onProject.com Launches Powerful, Affordable Web-Based Business Collaboration and Project Management Service," PR Newswire. New York: Feb. 22, 2000. p. 1.*

Lori Mitchell; Doug Dineley. "Test Center Comparison: Web-based project management—project meets portal," InfoWorld; Jan. 31, 2000, vol. 22 Issue 5, p. 62.*

J. Mark Andersen; Kathy Cheak; John Jurewicz Jr. "Managing projects online," American School & University; Nov. 2000; 73, 3.*

Nelson King. "Project.net; An unusual mixture of project management with workflow and document management, Project.net is a capable and flexible product," PC Magazine. New York: Oct. 15, 2002. vol. 21, Iss. 18; p. 28.*

Kristine Fallon. "Take a look inside Web-based project management" Design Firm Management & Administration Report; Jan. 2003.*

Anonymous. "Web-based project management yields results for Chicago Transit Authority," Contractor's Business Management Report; Feb. 2003.*

Eric Knorr. "Blueprint for Web Services," InfoWorld; Dec. 1, 2003, vol. 25 Issue 47, p. 32-44.*

Anonymous. "Autotask Launches Web-Based Productivity Suite for Small & Mid-Size Project-Driven Companies," Business Wire. New York: Oct. 12, 2004.*

"iTeamwork," Retrieved from the Internet: http://www.iteamwork.com/, Retrieved on Nov. 9, 2005, 3 pgs.

"Basecamp; Project Management Utopia," Retrieved from the Internet: http://www.basecamphq.com/, Retrieved on Nov. 9, 2005, 4 pgs.

"Projectinsight; Project Insight System Requirements," Retrieved from the Internet: http://www.projectinsight.net/ProductInformation/Specifications.aspx, Retrieved on Nov. 9, 2005, 2 pgs.

"EasyProjects.NET," Retrieved from the Internet: http://www.easyprojects.net/overview.asp, Retrieved on Nov. 9, 2005, 3 pgs.

European Search Report for European Patent Application No. EP 06 78 9188 mailed Jun. 17, 2008.

* cited by examiner

SERVER-SIDE PROJECT MANAGER

BACKGROUND

A project management application manages tasks associated with a project. A project management application program allows a user to define project goals, plan tasks and resources, schedule tasks for completion to achieve a goal, display a project plan, and carry out and manage the project. The project management application program provides many benefits including: automatically calculating the project schedule; automatically updating the project schedule if task information has been changed; analyzing the project schedule to schedule resources and evaluate alternatives; providing schedule output in a standard format which is consistent for all projects; and storing the schedule data for use in future projects. A project management schedule is composed of tasks. The schedule defines the sequence in which the tasks occur, the resources needed to complete the task, and calendar information associated with the tasks. Each task is defined to include information associated with the start and finish date and time, the percentage of work completed, the required resources, projected and actual costs, etc.

SUMMARY

A server-side project manager utilizes a set of web service application program interface (API) calls to create, update, schedule and manage projects on a server. A user initiates a project update process call by submitting a project update request when the user creates a new project or modifies an existing project from a project application. The project update request is submitted to a web service via a web browser interface. The project update request is associated with an API that calls the server via the web service to update the project. Example APIs include a data retrieval call, an administrative call and a data update call. A processor compares the project update request to any existing project definition to identify update values. A set of calculations is performed using the update values and any existing project definition. The project is updated based on the calculation results and stored in a data store.

Other aspects of the invention include system and computer-readable media for performing these methods. The above summary of the present disclosure is not intended to describe every implementation of the present disclosure. The figures and the detailed description that follow more particularly exemplify these implementations.

DETAILED DESCRIPTION

Figure 1:
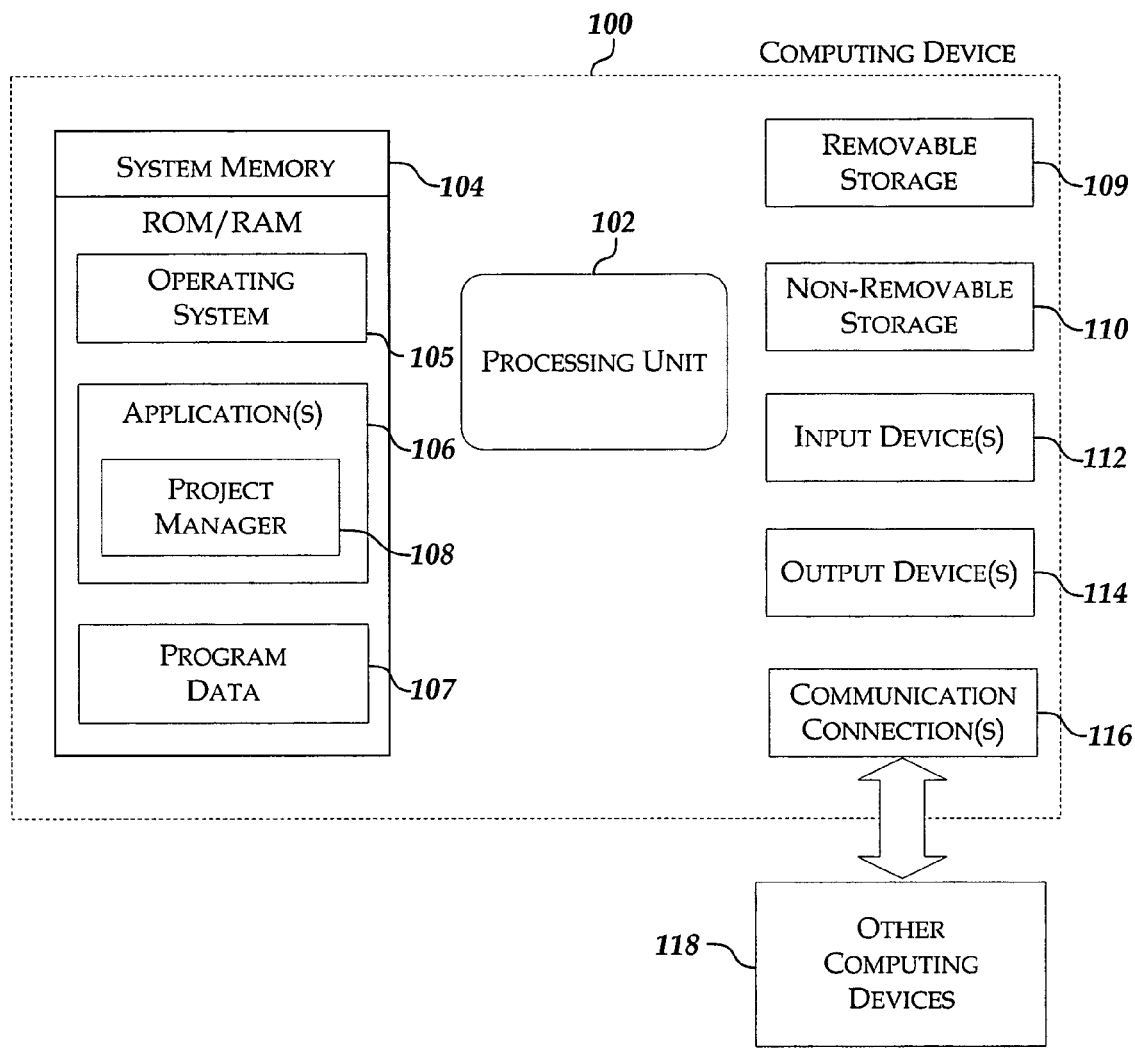
FIG. 1 is a functional block diagram illustrating an exemplary computing device that may be used in one aspect of the present invention.

A server-side project manager utilizes a set of web service APIs to create, update, schedule and manage projects on a server. A user submits a project update request when the user creates a new project or modifies an existing project. The project update request is associated with an API that calls the server via a web service to update the project. Example APIs include a data retrieval call, an administrative call or a data update call. A processor compares the project update request to any existing project definition to identify update values. A set of calculations is performed using the update values and any existing project definition. The project is updated based on the calculation results and stored in a data store.

Embodiments of the present invention are described in detail with reference to the drawings, where like reference numerals represent like parts and assemblies throughout the several views. Reference to various embodiments does not limit the scope of the disclosure, which is limited only by the scope of the claims attached hereto. The examples set forth in this specification are not intended to be limiting and merely set forth some of the many possible embodiments. The following detailed description is, therefore, not to be taken in a limiting sense.

Illustrative Operating Environment

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include project manager 108 that is discussed in further detail below.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Server-Side Project Manager

The present disclosure is described in the general context of computer-executable instructions or components, such as software modules, being executed on a computing device. Generally, software modules include routines, programs, objects, components, data structures, and the like that perform particular tasks or implement particular abstract data types. Although described here in terms of computer-executable instructions or components, the invention may equally be implemented using programmatic mechanisms other than software, such as firmware or special purpose logic circuits.

Figure 2:
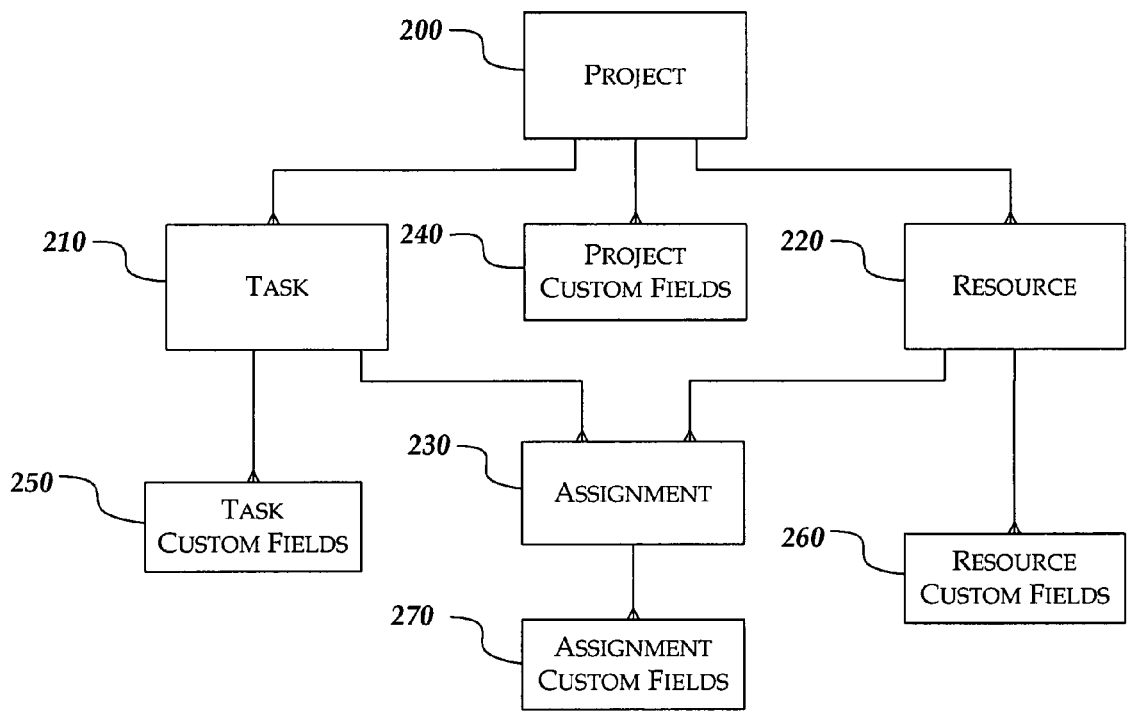
FIG. 2 illustrates a block diagram of a project dataset that defines data fields that may be updated using server side project API calls.

FIG. 2 illustrates a block diagram of a project dataset that defines data fields that may be updated using server side project API calls. The project dataset includes project data table 200, task data table 210, resource data table 220 and assignment data table 230. Project data table 200 includes project header information. Task data table 210 includes task information, where a task is an action to be performed on a project. Tasks may be dependent on each other. Resource data table 220 includes information about a person or persons that are working on the project. Resources may be local or enterprise-wide. Assignment data table 230 defines a relationship between resources and tasks. In other words, an assignment identifies the resource that is scheduled to complete the corresponding task.

Project 200 may also include ancillary data structures specific to a particular project implementation. For example, project data table 200 may be associated with project custom fields data table 240. Project custom fields data table 240 includes user-defined data for projects. Task data table 210 may be associated with task custom fields data table 250. Task custom fields data table 250 includes user-defined data for tasks. Resource data table 220 may be associated with resource custom fields data table 260. Resource custom fields data table 260 includes user-defined data for resources. Assignment data table 230 may be associated with assignment custom fields data table 270. Assignment custom fields data table 260 includes user-defined data for assignments. Custom field data tables 240, 250, 260, 270 promote system extensibility because they allow a user to input their own tasks, assignments, resources, and projects.

Figure 3:
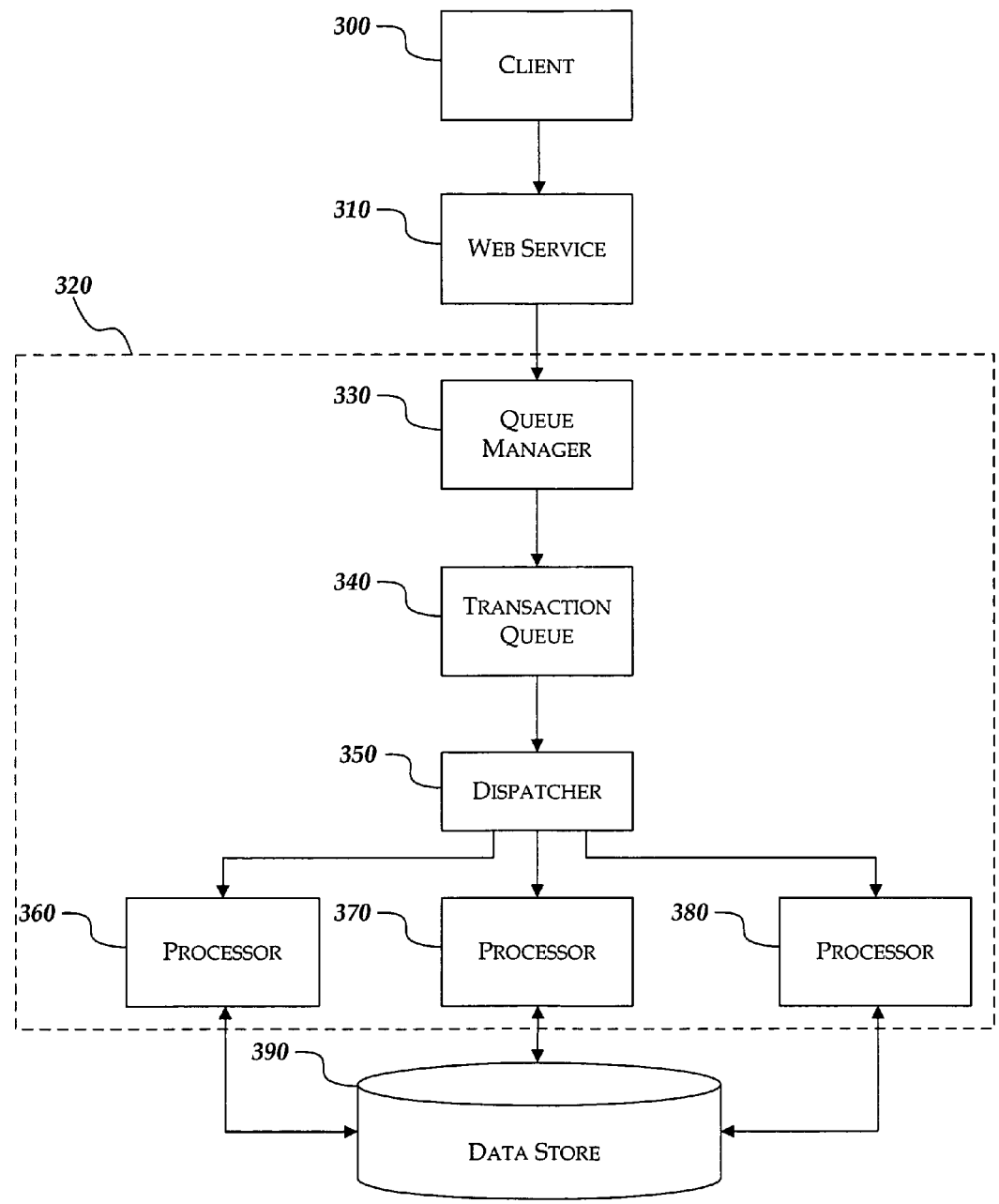
FIG. 3 illustrates a functional block diagram of a system for managing a project on a server.

FIG. 3 illustrates a functional block diagram of a system for managing a project on a server. The system includes client 300, web service 310, server 320 and data store 390. Server 320 includes queue manager 330, transaction queue 340, dispatcher 350, and processors 360, 370, 380. A user initiates a project update process call by submitting a project update request at client 300. The project update request is submitted when a user creates a new project or modifies an existing project on a project application loaded at client 300. The project update request may include a request to change scheduling information associated with the project. The project update request may also include a request to modify information stored in data store 390. The project update request is submitted to web service 310 via a web browser interface. Some preliminary input data validation may be performed. The project update request is associated with an application program interface (API) that calls server 320 via web service 310 to update the project and perform calculations. Example APIs are described in detail below.

The project update request is submitted to queue manager 330. Queue manager 330 monitors incoming requests and stores the requests in transaction queue 340. Dispatcher 350 forwards the project update request to an available processor (360, 370, or 380). Multiple processors assist in load balancing and demand smoothing.

The processor determines update values from the project update request and any existing project definition. If the project update request is associated with a newly created project, then the processor does not reference an existing project definition. The update values may be determined directly from the project update request or from the difference between the project update request and the existing project definition. A set of calculations is performed using the update values and any existing project definition. Example calculations include node consistency calculations, scheduling operations, roll-up calculations, and custom field calculations. The project is updated on data store 390 based on the calculation results.

When a user modifies a particular project data element or field (e.g., a task or an assignment) node consistency calculations are performed such that related data elements and fields are updated to maintain consistency. For example, a task may have a start date set for Monday and a finish date set for Wednesday. The duration of the task is three days. The user may extend the finish date to Thursday. This modification creates a data inconsistency because the duration of the task in now four days. Node consistency calculations are performed to resolve data inconsistencies such that the duration data field is automatically updated to reflect the modification. Thus, the task duration is updated to be four days.

Scheduling operations perform critical path scheduling and determine any scheduling conflicts that may arise due to time constraints. Scheduling operations may be performed by a scheduling engine on server 220. In one example, schedule operations determine which days on a calendar are official work days such that tasks are not scheduled to be performed on non-work days.

Roll-up calculations are performed to compile project information and generate a summary of the compiled information. In one embodiment, multiple tasks may be associated with a summary task. A roll-up calculation compiles information shared between the multiple tasks for inclusion with the summary task. For example, one task may be scheduled to be performed Monday-Wednesday. Another task may be scheduled to be performed Thursday and Friday. Both tasks may be grouped together under a single summary task. The summary task has a duration of five days.

A user may establish custom fields for projects, tasks, resources and assignments. The custom field may be defined to perform a calculation to express a metric about the project. For example, a custom field named "days late" may be defined to perform a calculation of the actual finish date of a task minus the scheduled finish date.

A set of web service APIs are called to create, update, schedule and manage projects on a shared server. The APIs include data retrieval calls, administrative calls and data update calls. The data retrieval calls include ReadProject and ReadProjectTeam. The administrative calls include CheckOutProject and CheckInProject. The data update calls include CreateProject, CreateProjectFromTemplate, UpdateProject, AddToProject, DeleteFromProject, UpdateProjectTeam, and Calculate. Each of these calls is discussed in detail below.

ReadProject is called to read data for a single project. For example, projectDS=project.ReadProject(projectID);
where, "projectDS" is a project dataset to be returned with project data from the database.
"project" is a reference to the server-side project web service proxy.
"projectID" is the GUID of the project from which the tasks, dependencies, resources or assignments are deleted.

CheckOutProject is called to reserve a project for editing or deletion. If the project is unavailable for editing, an exception is raised. A project should be locked before any changes are made to either the client application or the server APIs. The lock is an application-level logical lock. When used along with the server-side project APIs, the check-out operation is logically equivalent to opening a project read-write operation in the client application. The check-out operation is synchronous and is processed immediately. For example,
project.CheckOutProject(projectID, sessionID, sessionDesc);
where, "project" is a reference to the server-side project web service proxy.
"projectID" is the GUID of the project to be checked-out.
"sessionID" is a unique identifier supplied by the caller. The logical lock on the project is associated with the sessionID GUID and the user making the check-out call. Subsequent operations against the checked-out project are only accepted if the user is the same as the one who checked out the project and the sessionID GUID is supplied with the call.
"sessionDesc" is an optional user-supplied string that is stored as part of the project while the project is checked out to indicate the user associated with the checked-out project. In one embodiment, the string is the client name to which the project was checked out. For server side project calls, the user may supply whatever string makes sense to them. Typically, the string is the name of the process that performed the check-out (e.g. "Timesheet updates").

CheckInProject releases the project lock. If changes are pending against a project (i.e., in the queue), the check-in operation is queued to occur upon completion of the changes. If no changes are pending, the check-in operation occurs immediately. Projects are checked in by the user who performed the check-out, or by a user with administrator privileges using a "forced check-in" option. The check-in operation forces a recalculation of any data in the database. For example,
project.CheckInProject(projectID, checkinOption, sessionID, sessionDesc);
where, "project" is a reference to the server-side project web service proxy.
"projectID" is the GUID of the project to be checked-out.
"checkinOption" defines any options associated with the check-in operation.

Example options include normal and forced. A normal check-in operation unlocks the project. Subsequent "Open read-write in the project application" or "Read for update" server-side project calls receive an unpublished copy of the project from the database. All other project read APIs and project web access continue to see the published version of the project. A forced check-in operation requires administrator privileges and the sessionID GUID is ignored. Any unsaved changes in the project application are lost.
"sessionID" is the session identifier used when the project was checked out. If either the calling user or the sessionID are different than those used in the check-out call, the check-in operation fails (except for an administrative check-in).
"sessionDesc" is an optional user-supplied string. The string may be ignored by the server but may be used for diagnostic purposes, i.e., if the string does not agree with the string supplied with the check-out call.

CreateProject is used to create a new project. For example,
project.CreateProject(projectDS, validateOnly);
where, "project" is a reference to the server-side project web service proxy.
"projectDS" is a project dataset populated with the project header, task, dependency, resource and assignment information to add to the project.
"validateOnly" is a Boolean value indicating whether the call should create the project or perform data validation. If a "True" result is generated, only data validation is performed without updating the database. If a "False" result is generated, data validation is performed and the project is created if no errors are found. The project dataset may include tasks, assignments and resources as well as the project header information. Only one project may be created per call. If multiple projects are specified in the dataset, only the first project is considered and the data for all other projects is ignored.

CreateProjectFromTemplate creates a new project based on an existing project template. For example,
newProjectID=project.CreateProjectFromTemplate(templateID, newProjectName, newProjectVersionID);
where, "newProjectID" is a system-assigned GUID identifying the newly created project.
"project" is a reference to the server-side project web service proxy.
"templateID" is the GUID of the template to use as the basis for the new project.
"newProjectName" is the name to give to the newly created project.
"newProjectVersionID" is the GUID of the version to associate with the new project.

UpdateProject updates an existing project and/or existing tasks, resources and assignments. For example,
project.CreateProject(sessionID, projectDS, validateOnly);
where, "project" is a reference to the server-side project web service proxy.
"sessionID" is the session identifier that was used when the project was checked out. If either the calling user identifier or the session identifier is different than those used in the check-out call, the update operation fails.
"projectDS" is a project dataset containing the changes to the project header or existing tasks, dependencies, resources and assignments.
"validateOnly" is a Boolean value indicating whether the call should create the project or perform data validation. If a "True" result is generated, only data validation is performed without updating the database. If a "False" result is generated, data validation is performed and the project is created if no errors are found. The project dataset may include tasks, assignments and resources as well as the project header information. All rows in the dataset refer to existing entities. One project is created per call. If multiple projects are specified in the dataset, only the first one is considered and the data for all other projects is ignored.

AddToProject adds new tasks, dependencies, resources and assignments to an existing project. For example, project.AddToProject(sessionID, projectDS, validateOnly);

where, "project" is a reference to the server-side project web service proxy.

"sessionID" is the session identifier used when the project was checked out. If either the calling user identifier or the session identifier is different than those used for the check-out call, the call fails.

"projectDS" is a populated project dataset. Data tables for the tasks, dependencies, resources and assignments are used. The project data table is ignored.

"validateOnly" is a Boolean value indicating whether the call should create the project or perform data validation. If a "True" result is generated, only data validation is performed without updating the database. If a "False" result is generated, data validation is performed and the project is created if no errors are found. The project dataset may include tasks, assignments and resources as well as the project header information. All rows in the dataset refer to existing entities. One project may be created per call. If multiple projects are specified in the dataset, only the first one is considered and the data for all other projects is ignored.

DeleteFromProject deletes tasks, dependencies, resources and assignments from an existing project. For example, project.DeleteFromProject(sessionID, projectID, deleteGUIDs[]);

where, "project" is a reference to the server-side project web service proxy.

"sessionID" is the session identifier used when the project was checked out. If either the calling user identifier or the session identifier is different than those used in the check-out call, the call fails.

"projectID" is the GUID of the project from which the tasks, dependencies, resources or assignments are deleted.

"deleteGUIDs" array contains the GUIDs of the tasks, dependencies, resources or assignments to be deleted.

Only one project may be deleted per call. If a delete GUID refers to an entity that is not in the specified project, an exception occurs and the delete operation fails. Assignments and resources with actual work on the project cannot be deleted if the "protected actuals" option is selected for the project.

ReadProjectTeam returns a list of the resources on a project. This call is intended primarily for use by a team builder page in project web access. For example, projectTeamDS=project.ReadProjectTeam(projectID);

where, "projectTeamDS" is a dataset containing the Project Team data table.

"project" is a reference to the server-side project web service proxy.

"projectID" is the GUID of the project to add the resources to.

The calling user has assign permission on the enterprise resources being added, or a security exception occurs and the call fails. If the specified enterprise resource already exists on the project team, the enterprise resource is updated with the latest enterprise resource data.

UpdateProjectTeam makes changes to the resources assigned to a project. The changes may include: adding new enterprise resources to the project team, removing resources from the project team, replacing existing resources with other enterprise resources (and updating affected assignments), and changing the booking type of existing resources. For example, project.ReplaceResources(sessionID, projectID, projectTeamDS);

where, "project" is a reference to the server-side project web service proxy.

"sessionID" is the session identifier used when the project was checked out. If either the calling user identifier or the session identifier is different than those used in the check-out call, the call fails.

"projectID" is the GUID of the project to replace resources on.

"projectTeamDS" is a dataset containing the Project Team data table. This call may be used to change the booking type on enterprise or local resources. The booking type for local resources is only visible within the local project because local resources do not have summary resource assignments that are shared between projects. The booking type for local resources has no meaning outside of the project.

Calculate reschedules the project and recalculates custom formula fields after a series of updates to the project definition. For example, project.Calculate(sessionID, projectID);

where, "project" is a reference to the server-side web service proxy.

"sessionID" is the session identifier used when the project was checked out. If either the calling user identifier or the session identifier is different than those used in the check-out call, the call fails.

"projectID" is the GUID of the project to replace resources on.

As discussed above, the capabilities offered by the API calls include: creating new projects; updating existing projects including adding, deleting and updating tasks, dependencies between tasks, project team resources and task resource assignments; managing data contention on project data; and scheduling and publishing of the calculated schedule results and work assignments for use in a project web access application.

Figure 4:
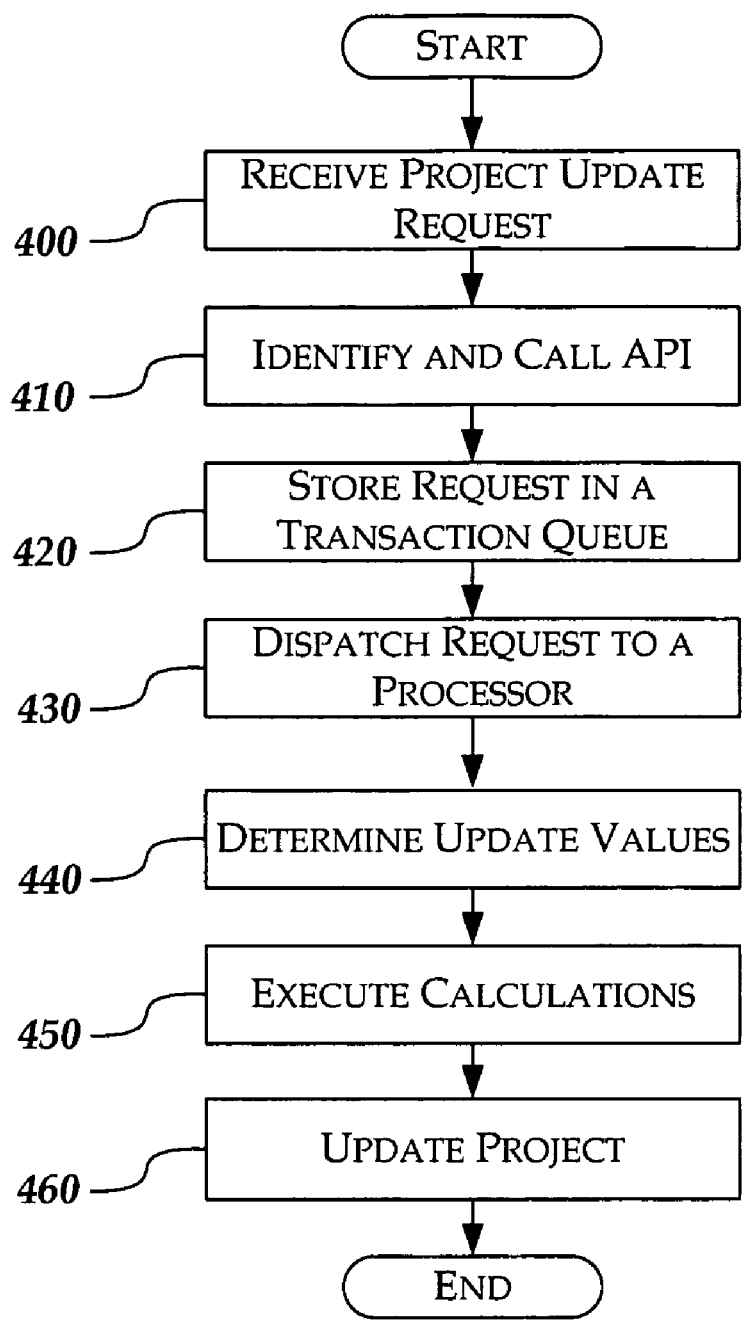
FIG. 4 is an operational flow diagram illustrating a process for managing a project on a server.

FIG. 4 is an operational flow diagram illustrating a process for managing a project on a server. Processing begins at a start block where a project application is loaded on a client. A user initiates a project update call by submitting a project update request at the client. The project update request is submitted when a user creates a new project or modifies an existing project. The project update request is associated with an API call. A web browser interface on the client submits the project update request to a web service where input data validation may be performed. The web service receives the project update request at block 400.

Moving to block 410, the API associated with the project update request is identified by the web service and called. The API may be a data retrieval call, an administrative call or a data update call. The APIs are called to create, update, schedule and manage projects on the server. For example, if the project update request is to create a new project, the CreateProject API is identified and called. Likewise, if the project update request is to delete a task from the project, the DeleteFromProject API is identified and called.

Transitioning to block 420, the project update request is submitted to a queue manager and stored in a transaction queue in a server. Proceeding to block 430, the project update request is dispatched from the transaction queue to a processor on the server. The project update request may be dispatched to one processor in a group of processors. The processor that the project update request is dispatched to may be selected such that the load among the group of processors is balanced and processor demand is smoothed.

Continuing to block 440, changes to the project submitted by the user are determined when the processor identifies update values from the project update request. The processor may also identify an existing project definition if the project update request is not associated with a newly created project. The update values may be determined by comparing the project update request to any existing project definition.

Advancing to block 450, calculations are executed using the update values and any existing project definition. The results of the calculations provide new project data values for the project. Example calculations include node consistency calculations, scheduling operations, roll-up calculations and custom field calculations. Node consistency calculations are used to update project data that is associated with data directly modified by the project update request such that consistency is maintained throughout the project. Scheduling operations perform critical path scheduling and determine any scheduling conflicts that may arise due to time constraints. Roll-up calculations provide for a summary by compiling shared information. Custom field calculations are calculations performed on user-defined data fields. Moving to block 460, the project is updated using the new project data values together and stored in a data store. Processing then terminates at an end block.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for execution on a project server to cause a web-services application programming interface ("API") call to execute and manage a project maintained on the project server, the computer-implemented method comprising:

sending a project update request to the web-services API using a web-browser of a client computer, wherein the project update request includes a value and an API call, wherein the API call includes an API call from a set of API calls that include: an update project API call, an add to project API call, a delete from project API call, an update project team API call, and a calculate API call;

receiving the project update request on the project server;

submitting the project update request to a queue manager on the project server;

transferring the project update request, via the queue manger, to a transaction queue;

dispatching the project update request, via the queue manager, from the transaction queue to one of a plurality of processors, wherein dispatching includes load balancing and demand smoothing;

executing the API call on the project server, wherein:

when the API call is an update project API call, causing the project server to identify a project identifier and project dataset updates from the value and causing the project server to compare the project dataset updates to an existing project definition located on the project server to update a project identified by the project identifier according to the project dataset updates of the value, when the API call is an add to project API call, causing the project server to identify a project identifier and project dataset additions from the value and causing the project server to compare the project dataset additions to an existing project definition located on the project server to update an existing project identified by the project identifier according to the project dataset additions of the value, when the API call is a delete from project API call, causing the project server to identify a project identifier and project dataset deletions from the value and causing the project server to compare the project dataset deletions to an existing project definition located on the project server to update an existing project identified by the project identifier according to the project dataset deletions of the value, when the API call is a update project team API call, causing the project server to identify a project identifier and a resource identifier from the value and causing the project server to compare the resource identifier to an existing project definition located on the project server to change resources of an existing project identified by the project identifier according to the resource identifier of the value, and when the API call is a calculate API call, causing the project server to identify a project identifier and a rescheduling identifier from the value and causing the project server to compare the rescheduling identifier to an existing project definition located on the project server to change the schedule of an existing project identified by the project identifier according to the rescheduling identifier of the value; and resolving any data inconsistencies by performing node consistency calculations such that affected data is automatically updated to reflect any project modifications.

2. The computer-implemented method of claim 1, wherein the node consistency calculation resolves task duration inconsistency of a plurality of tasks based on modified task data associated with a value of the API call.

3. The computer-implemented method of claim 1, wherein the project server is further configured to perform a critical path calculation on an existing project located in the project server, wherein the critical path calculation determines a critical path schedule based on modified task data associated with a value of the API call.

4. The computer-implemented method of claim 1, wherein the project server is further configured to perform a roll-up calculation on an existing project located on the project server, wherein the roll-up calculation causes a compilation of project data and a generation of a project summary.

5. The computer-implemented method of claim 1, wherein the project server is further configured to perform a custom field calculation on an existing project located on the project server, wherein the custom field calculation defines a custom calculation of the project.

6. The computer-implemented method of claim 1, wherein the value of the API call is a modified value generated from a difference between the project update request and an existing project definition located on the project server.

7. The computer-implemented method of claim 1, wherein the value of the project update request includes at least one member of a group comprising: a task value for a project on the project server, a task dependent value for a project on the project server, a resource value for a project on the project server, and an assignment value for a project on the project server.

8. A computer-readable storage medium having computer-executable instructions for causing a web-services application programming interface ("API") call to execute and manage a project maintained on the project server, the instructions comprising:

sending a project update request to the web-services API using a web-browser on a client device, wherein the project update request includes a value and an API call, wherein the API call includes an update API call from a set of API calls that include: an update project API call, an add to project API call, a delete from project API call, an update project team API call, and a calculate API call;

receiving the project update request on the project server;

submitting the project update request to a queue manager on the project server;

transferring the project update request, via the queue manger, to a transaction queue;

dispatching the project update request, via the queue manager, from the transaction queue to one of a plurality of processors, wherein dispatching includes load balancing and demand smoothing;

executing the API call on the project server, wherein:

when the API call is an update project API call, causing the project server to identify a project identifier and project dataset updates from the value and causing the project server to compare the project dataset updates to an existing project definition located on the project server to update a project identified by the project identifier according to the project dataset updates of the value, when the API call is an add to project API call, causing the project server to identify a project identifier and project dataset additions from the value and causing the project server to compare the project dataset additions to an existing project definition located on the project server to update an existing project identified by the project identifier according to the project dataset additions of the value, when the API call is a delete from project API call, causing the project server to identify a project identifier and project dataset deletions from the value and causing the project server to compare the project dataset deletions to an existing project definition located on the project server to update an existing project identified by the project identifier according to the project dataset deletions of the value, when the API call is a update project team API call, causing the project server to identify a project identifier and a resource identifier from the value and causing the project server to compare the resource identifier to an existing project definition located on the project server to change resources of an existing project identified by the project identifier according to the resource identifier of the value, and when the API call is a calculate API call, causing the project server to identify a project identifier and a rescheduling identifier from the value and causing the project server to compare the rescheduling identifier to an existing project definition located on the project server to change the schedule of an existing project identified by the project identifier according to the rescheduling identifier of the value; and resolving any data inconsistencies by performing node consistency calculations such that affected data is automatically undated to reflect any project modifications.

9. The computer-readable storage medium of claim 8, wherein the node consistency calculation resolves task duration inconsistency of a plurality of tasks based on modified task data associated with a value of the API call.

10. The computer-readable storage medium of claim 8, wherein the project server is further configured to perform a critical path calculation on an existing project located in the project server, wherein the critical path calculation determines a critical path schedule based on modified task data associated with a value of the API call.

11. The computer-readable storage medium of claim 8, wherein the project server is further configured to perform a roll-up calculation on an existing project located on the project server, wherein the roll-up calculation causes a compilation of project data and a generation of a project summary.

12. The computer-readable storage medium of claim 8, wherein the project server is further configured to perform a custom field calculation on an existing project located on the project server, wherein the custom field calculation defines a custom calculation of the project.

13. The computer-readable storage medium of claim 8, wherein the value of the API call is a modified value generated from a difference between the project update request and an existing project definition located on the project server.

14. The computer-readable storage medium of claim 8, wherein the value of the project update request includes at least one member of a group comprising: a task value for a project on the project server, a task dependent value for a project on the project server, a resource value for a project on the project server, and an assignment value for a project on the project server.

15. A system for causing a web-services application programming interface ("API") call to execute and manage a project maintained on the project server, the instructions comprising:

a processor; and a memory having computer-executable instructions stored thereon, wherein the computer executable instructions are configured for:

sending a project update request to the web-services API using a web-browser on a client computer, wherein the project update request includes a value and an API call, wherein the API call includes an update API call from a set of API calls that include: an update project API call, an add to project API call, a delete from project API call, an update project team API call, and a calculate API call;

receiving the project update request on the project server;

submitting the project update request to a queue manager on the project server;

transferring the project update request, via the queue manger, to a transaction queue;

dispatching the project update request, via the queue manager, from the transaction queue to one of a plurality of processors, wherein dispatching includes load balancing and demand smoothing;

executing the API call on the server, wherein:

when the API call is an add to project API call, causing the project server to identify a project identifier and project dataset additions from the value and causing the project server to compare the project dataset additions to an existing project definition located on the project server to update an existing project identified by the project identifier according to the project dataset additions of the value, when the API call is a delete from project API call, causing the project server to identify a project identifier and project dataset deletions from the value and causing the project server to compare the project dataset deletions to an existing project definition located on the project server to update an existing project identified by the project identifier according to the project dataset deletions of the value, when the API call is a update project team API call, causing the project server to identify a project identifier and a resource identifier from the value and causing the project server to compare the resource identifier to an existing project definition located on the project server to change resources of an existing project identified by the project identifier according to the resource identifier of the value, and when the API call is a calculate API call, causing the project server to identify a project identifier and a rescheduling identifier from the value and causing the project server to compare the rescheduling identifier to an existing project definition located on the project server to change the schedule of an existing project identified by the project identifier according to the rescheduling identifier of the value; and resolving any data inconsistencies by performing node consistency calculations such that affected data is automatically undated to reflect any project modifications.

16. The system of claim 15, wherein the node consistency calculation resolves task duration inconsistency of a plurality of tasks based on modified task data associated with a value of the API call.

17. The system of claim 15, wherein the project server is further configured to perform a critical path calculation on an existing project located in the project server, wherein the critical path calculation determines a critical path schedule based on modified task data associated with a value of the API call.

18. The system of claim 15, wherein the project server is further configured to perform a roll-up calculation on an existing project located on the project server, wherein the roll-up calculation causes a compilation of project data and a generation of a project summary.

19. The system of claim 15, wherein the project server is further configured to perform a custom field calculation on an existing project located on the project server, wherein the custom field calculation defines a custom calculation of the project.

20. The system of claim 15, wherein the value of the API call is a modified value generated from a difference between the project update request and an existing project definition located on the project server.

* * * * *